United States Patent
Wright et al.

(10) Patent No.: US 6,784,407 B2
(45) Date of Patent: Aug. 31, 2004

(54) BENCH TOP TUBING SEALER

(75) Inventors: Douglas F. Wright, Tucson, AZ (US); Leonard T. Williams, Tucson, AZ (US); Tulsie P. Summer, Tucson, AZ (US)

(73) Assignee: Engineering & Research Associates, Inc., Tucson, AZ (US)

( * ) Notice: Subject to any disclaimer, the term of this patent is extended or adjusted under 35 U.S.C. 154(b) by 1 day.

(21) Appl. No.: 10/376,359

(22) Filed: Feb. 27, 2003

(65) Prior Publication Data

US 2004/0035844 A1 Feb. 26, 2004

Related U.S. Application Data

(60) Provisional application No. 60/404,956, filed on Aug. 21, 2002.

(51) Int. Cl.[7] ............................. H05B 6/54; B23B 19/02
(52) U.S. Cl. ...................... 219/769; 219/765; 219/777; 219/778; 156/273.7; 156/274.4; 156/380.6; 361/695
(58) Field of Search ............................... 219/769, 765, 219/770, 774, 777, 778, 779, 780, 632, 757, 736; 156/273.7, 274.4, 274.6, 380.6, 380.7, 380.3; 361/694, 695, 690, 692

(56) References Cited

U.S. PATENT DOCUMENTS

| | | | |
|---|---|---|---|
| 4,013,860 A | | 3/1977 | Hosterman et al. ....... 219/10.81 |
| 4,186,292 A | | 1/1980 | Acker ..................... 219/10.81 |
| 4,384,186 A | * | 5/1983 | Burt .......................... 219/769 |
| 4,390,832 A | | 6/1983 | Taylor ........................ 323/273 |
| 4,488,028 A | | 12/1984 | Acker et al. ............. 219/10.81 |
| 4,490,598 A | | 12/1984 | Minney et al. .......... 219/10.81 |
| 5,256,845 A | | 10/1993 | Schippers ................ 219/10.53 |
| 5,272,304 A | | 12/1993 | Been et al. .............. 219/10.81 |
| 5,349,166 A | | 9/1994 | Taylor ....................... 219/643 |
| 6,265,703 B1 | * | 7/2001 | Alton ......................... 219/736 |

OTHER PUBLICATIONS

A flyer entitled "Genesis Tube Sealers" distributed by National Hospital Specialities with a presumed date of Sep. 2000.
A photocopy of a flyer entitled "Hand–held Tube Sealer" distributed by Baxter Healthcare Corporation and having a presumed date of 2002 pursuant to the copyright notice.
A photocopy of a flyer entitled "Mobile, Battery–operated, Hand–held Tube Sealer (HandySeal)" distributed by Baxter Healthcare Corporation and having a presumed date of 2002 pursuant to the copyright notice.

(List continued on next page.)

*Primary Examiner*—Philip H. Leung
(74) *Attorney, Agent, or Firm*—Cahill, von Hellens & Glazer, P.L.C.

(57) ABSTRACT

A desk top sealer includes three compartments for housing a solenoid assembly, a power supply and a circuit board, respectively. A source of air flow flows into an initial compartment and is channeled through apertures in brackets forming the two remaining compartments for cooling purposes and is exhausted from each compartment through a base. The circuit board, upon actuation, provides RF energy to a fixed ceramic/metal jaw to heat and weld plastic tubing clamped to the fixed jaw by a movable jaw at ground potential. The movable jaw is guided during translation by a pair of rods extending from a face plate, which rods also prevent rotation of the movable jaw about its axis of translation to maintain the movable jaw in alignment with the fixed jaw. The movable jaw is relatively massive to serve as a heat sink for the heat of the tubing being welded and includes a substantial surface area to dissipate to the ambient environment any heat buildup that may occur. A face plate, supporting the fixed and movable jaws, is configured to prevent flow of fluid from a burst tubing into the sealer and the face plate may house indicator lamps providing lights reflective of the operation being performed, which lights are visible through a translucent part of the face plate.

38 Claims, 7 Drawing Sheets

OTHER PUBLICATIONS

A photocopy of a flyer entitled "Portable, Battery-operated, Hand-held Tube Sealer (AutoSeal)" distributed by Baxter Healthcare Corporation and having a presumed date of 2000 pursuant to the copyright notice.

A photocopy of a flyer entitled "Teruflex ACS-152 Dielectric Sealer" Distributed by Terumo Medical Corporation and believed to have been available at a tradeshow in 2000.

A photocopy of a flyer entitled "Ace Sealer-01" distributed by Ace Medical Inc., and believed to have been available at a tradeshow in 2001.

A photocopy of a flyer entitled "Meeting the Demands for Today's Blood Bank Professional" distributed by National Hospital Specialities and believed to have been available at a tradeshow in 2002.

A photocopy of a flyer entitled "Composeal" and distributed by NPBI B.V., (undated).

A photocopy of a flyer entitled "Composeal Mobilea" distributed by NPBI (undated).

A photocopy of a flyer entitled "Tube Sealers" distributed by Hemopharm (undated).

A photocopy of a flyer entitled "Biosealer CR 6-PS" distributed by Ljungberg & Kogel AB (undated).

A photocopy of a flyer entitled "Biotrans Composeal" distributed by Biotrans GmbH (undated).

* cited by examiner

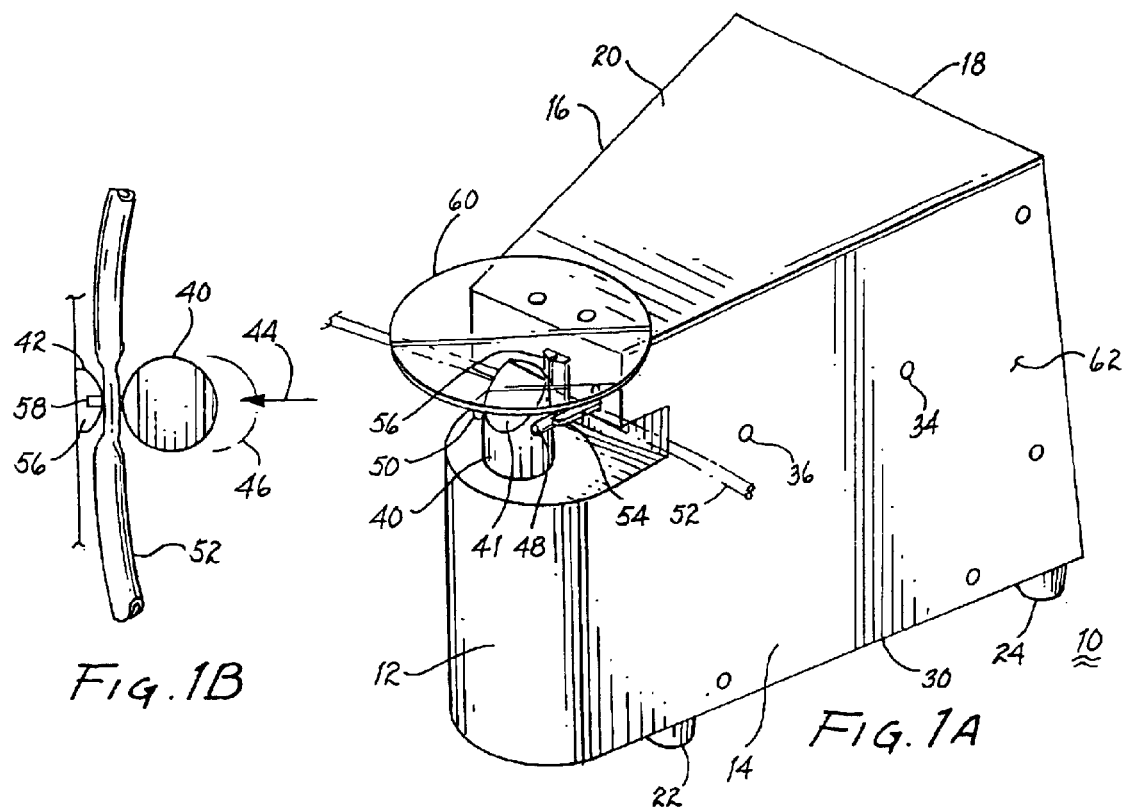

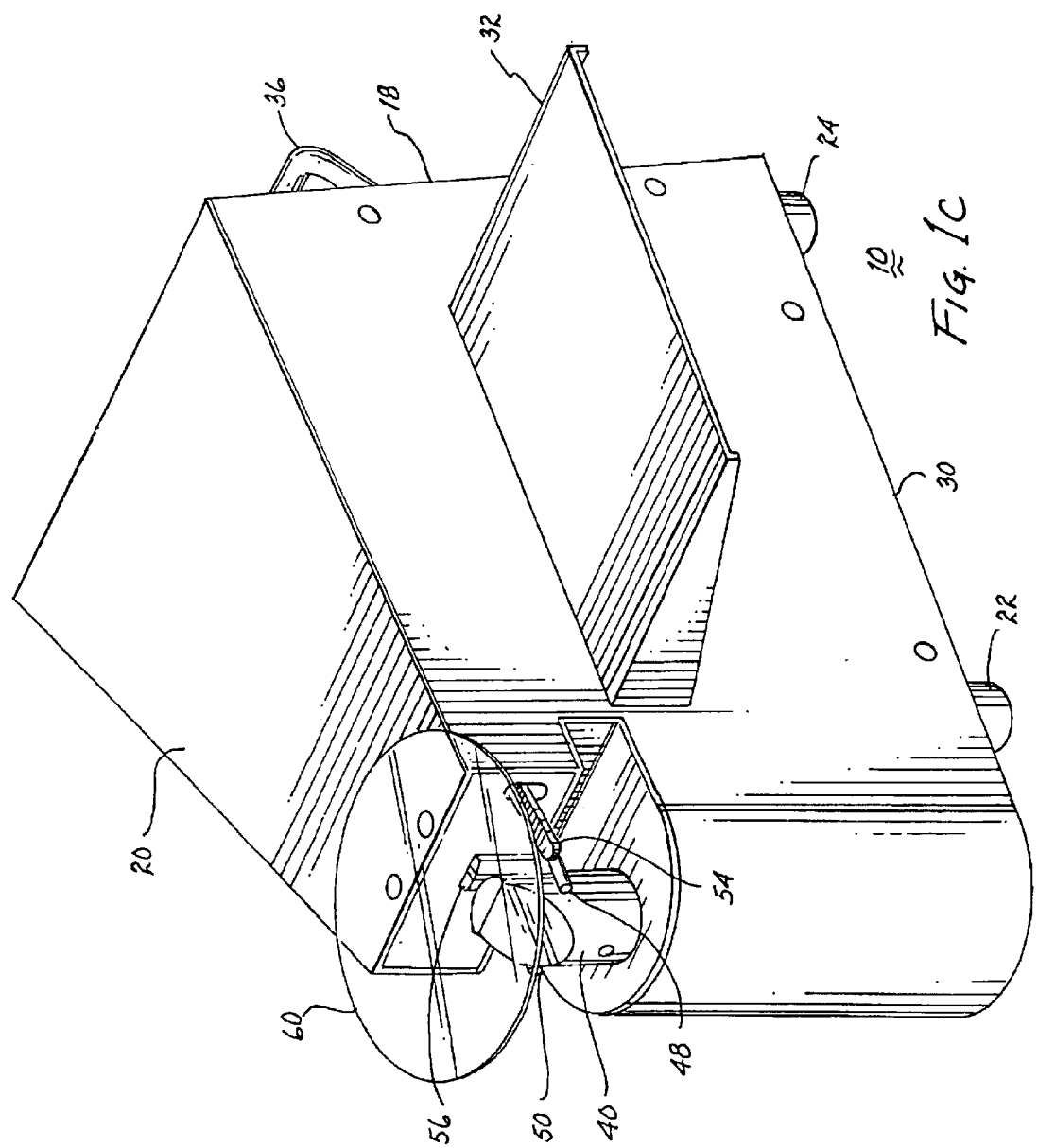

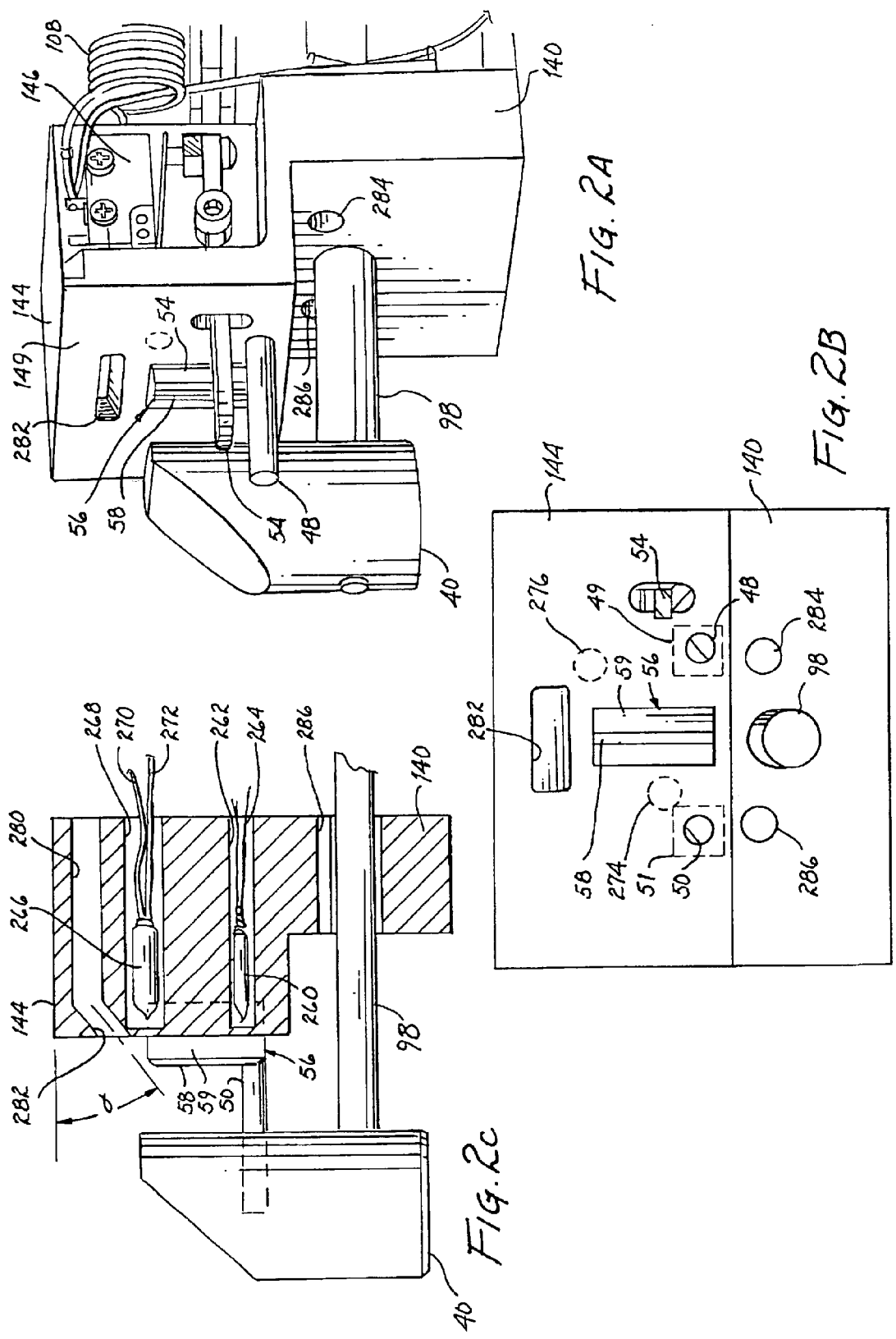

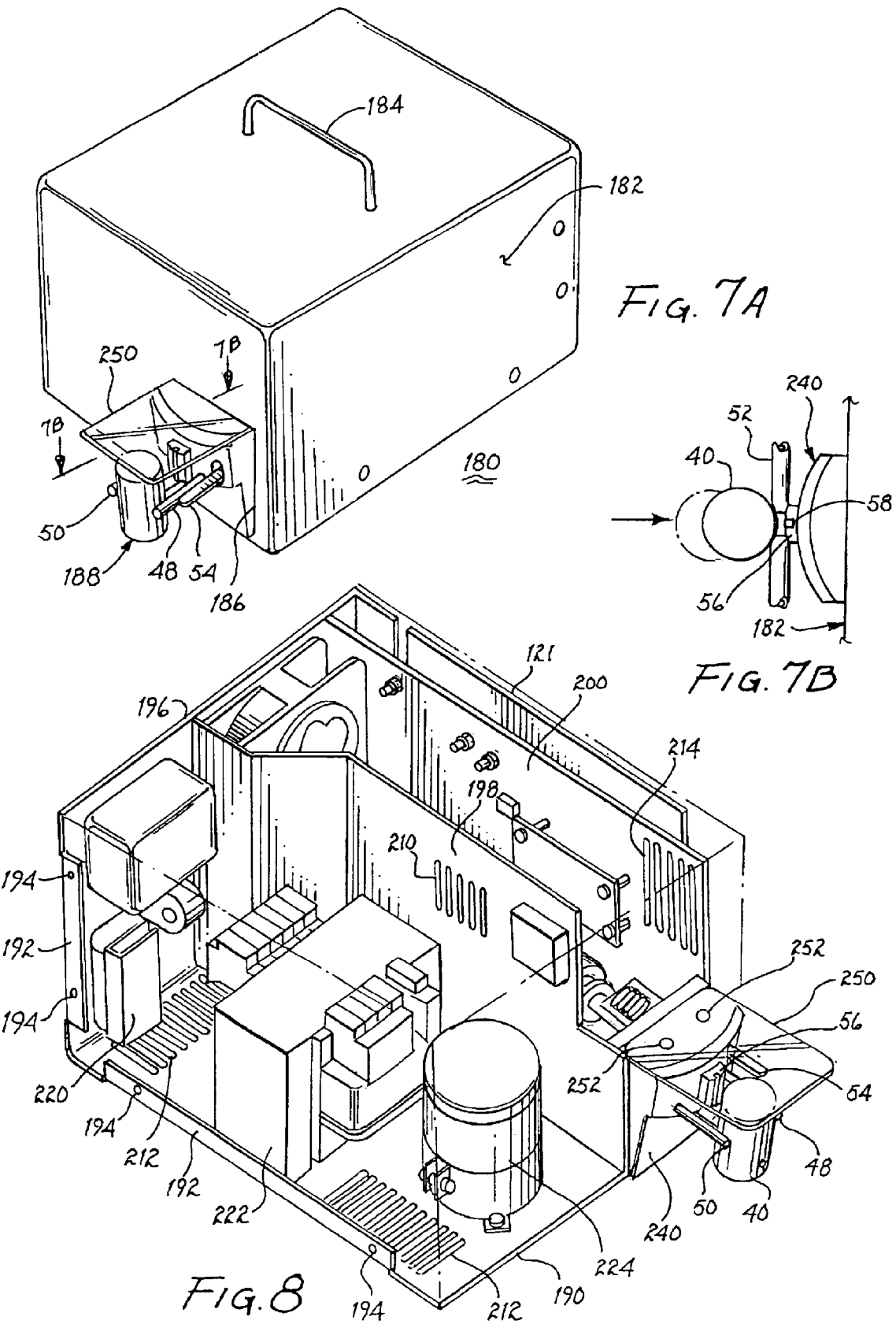

BENCH TOP TUBING SEALER

CROSS REFERENCE TO RELATED APPLICATION

The present application relates to subject matter described in and claims priority to a provisional application entitled "RF Sealer for Tubing", assigned Ser. No. 60/404,956 and assigned a filing date of Aug. 21, 2002 and describing an invention made by the present inventors.

BACKGROUND OF THE INVENTION

There is a continual existing need for blood donors in order to meet the day to day hospital demand for blood. The collection of blood from donors is a critical function performed in all towns, cities and metropolitan areas as the need for fresh blood and plasma by hospitals never diminishes. Consequently, various blood collection centers have been established at permanent locations and mobile blood collection units are employed to service remote areas or to obtain blood from donors at specific high density locations, such as shopping centers, factories, office buildings, etc.

The process for collecting blood is a relatively simple process with respect to the donors' participation. However, the means for testing, typing, storing and preserving the collected blood requires relatively sophisticated techniques and equipment to minimize loss from contamination or spoilage.

Normally, the blood is drawn from a donor through flexible tubing extending into a plastic blood collection bag. Once the bag is filled to a predetermined quantity/weight, the tubing must be sealed to prevent leakage and, more importantly, to prevent contamination and deterioration of the collected blood. After collection, the blood must be typed and tested under various criteria. To provide a representative supply of blood for these typing and testing purposes, a plurality of blood filled segments of the tubing are sealed from one another to provide a plurality of segreable sealed samples which are opened only for typing and testing purposes.

At most blood collection centers, such as those operated by the Red Cross, much of the manual labor is performed as charitable work by older persons. These persons often are physically handicapped by the natural processes of aging, by arthritis or by previous injuries. For those persons who perform the work of sealing segments of filled blood tubing, the operation of the equipment must require a minimum of effort, be easy to use after minimal instruction, and minimize operator fatigue. Furthermore, safeguards need to be employed to minimize splatter of blood from a burst segment coming in contact with an operator; furthermore, only the grounded, and not the positive, jaw may come in contact with an operator.

A desk mounted sealer, such as either of the sealers described in U.S. Pat. Nos. 4,186,292 and 4,529,859, both of which are assigned to the present assignee and incorporated herein by reference, is usable by an operator who is either seated or standing and it provides a line of sight for the operator in either position. Thereby, operator fatigue is diminished and accurate positioning of the liquid filled tubing to be automatically sealed is promoted. Through actuation of a tubing position sensing switch or a foot operated switch, a seal will be effected in the tubing placed intermediate a fixed jaw and a movable jaw thereby allowing the operator to use one or both hands to repetitively place and reposition the tubing intermediate the jaws. The housing for the sealer sealingly encloses the operative elements to preclude seepage of fluid thereinto from a burst liquid filled length of tubing. The shaft supporting the movable jaw and extending from within the housing is sealed through a wiping seal.

As particularly shown in the '859 patent, the fixed jaw includes a vertical channel attendant the structure forming the seal to accommodate rapid drainage of fluid in the event the tubing should burst during formation of the seal. The drainage will be exterior of the unit and thereby prevent contamination of the mechanical and electrical components attendant the unit. Switch means actuated by interception and reflection of a light beam attendant the fixed jaw triggers the unit to effect a seal and thereby eliminate operator actuation of the unit. Furthermore, it is common for an operator to place a blood bag upon the tube sealing unit when the tubing therefrom is being sealed. Spoilage of the blood will result if the bag placed upon the unit is subjected to heat above normal body temperature. The heat produced by certain of the components within the unit as a result of generation of RF energy to effect the tubing seals is channeled by conduction to the bottom plate or to a finned heat exchanger exterior of the unit. Dissipation of heat from both the bottom plate and the heat exchanger is by convection. Because of such heat channeling, the top of the unit upon which blood bags are often placed is generally maintained at essentially ambient temperature and spoilage of the blood will not occur.

SUMMARY OF THE INVENTION

The bench top tubing sealer described and illustrated herein embodies several unique concepts summarized below. Any tubing sealer includes three primary component assemblies of solenoid assembly to actuate a movable jaw, electrical power supply and electrical circuitry for generating RF energy to be applied to a fixed jaw. Each of these assemblies generates heat which must be dissipated. To minimize heat transfer between the three components, three compartments are created by internal structure and a cover. Air flow is channeled through each of the compartments to draw off heat from critical surfaces and components and is exhausted through outlet ports in the base. Safety measures enacted in the United States and in countries foreign thereto require containment of spurious and unauthorized RF radiation within the tubing sealer, which is accomplished by metallic shielding and the air outlet ports are configured to prevent RF spurious and unauthorized radiation therethrough. By using the circuit board with surface mount technology for the electronic circuitry and an internally located heat sink, heat generation is managed and minimized; furthermore, the compactness afforded by surface mount technology reduces the size of the required circuit board and permits significant air volume for cooling purposes. The relatively massive movable sealing and grounded jaw will absorb heat from the tubing and be cooled by convection. By slanting the attached supporting movable shaft, flow of any fluid along the shaft will be away from the sealer to avoid internal contamination. Status and signaling lights may be mounted within a translucent face plate to eliminate fluid access therepast into the sealer. A pair of rods guides the movable jaw and maintains its alignment with the fixed ceramic/metal positive sealing jaw. A lever operated micro switch responsive to correct placement of tubing between the jaws actuates the circuitry to generate the RF energy used to heat the tubing clamped between the jaws. The fixed jaw is integrated into the face plate in a manner to prevent the operator from touching the fixed jaw and thereby prevent injury from RF burn; additionally the massive size of the movable jaw, in combination with a splash guard, restricts operator access to the fixed jaw.

It is therefore a primary object of the present invention to provide channeling of cooling air and eliminate heat build up within a bench top tubing sealer.

Another object of the present invention is to provide a bench top tubing sealer having segregated internal compartments for containing the major components and for controlling the flow of cooling air therethrough.

Another object of the present invention is to provide a bench top tubing sealer that restricts external radiation of spurious RF energy at unauthorized frequencies.

Yet another object of the present invention is to provide segregated compartments within a tubing sealer, each compartment being in fluid communication with a source of air flow for cooling purposes.

Still another object of the present invention is to provide exhaust ports for a bench top tubing sealer which preclude transmission of unauthorized frequencies of RF radiation therethrough.

Still another object of the present invention is to provide a bench top tubing sealer that will not radiate RF energy at frequencies that may interfere with other electrical equipment that may be in proximity.

A further object of the present invention is to provide a bench top tubing sealer with numerous safeguards against the possibility of intrusion into the bench top tubing sealer of blood from burst tubing.

A yet further object of the present invention is to provide an ergonomically shaped bench top tubing sealer to minimize operator fatigue and to protect the operator from RF burns.

A yet further object of the present invention is to provide a method for cooling the components of a bench top tubing sealer without compromising containment of spurious and unauthorized RF radiation.

A yet further object of the present invention is to provide a large mass movable grounded sealing jaw for a tubing sealer to absorb heat from the tubing being welded and to be cooled by convection through its large surface area.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1A is a perspective view of a bench top tubing sealer;

FIG. 1B is a top view illustrating motion of a movable jaw used in conjunction with the bench top tubing sealer shown in FIG. 1A;

FIG. 1C is a perspective view of the bench top tubing sealer showing an attached shelf and a handle;

FIG. 2 is a perspective view of the bench top tubing sealer shown in FIGS. 1A and 1C with the cover removed;

FIG. 2A is a detailed view of the face plate shown in FIG. 2;

FIG. 2B is a front view of the face plate;

FIG. 2C is a partial cross sectional view of the face plate;

FIG. 7A illustrates a variant bench top tubing sealer;

FIG. 7B illustrates the movable jaw shown in FIG. 7A;

FIG. 8 is a perspective view of the chassis and components of the variant shown in FIG. 7A after removal of the cover;

DESCRIPTION OF THE PREFERRED EMBODIMENT

Figure 3:
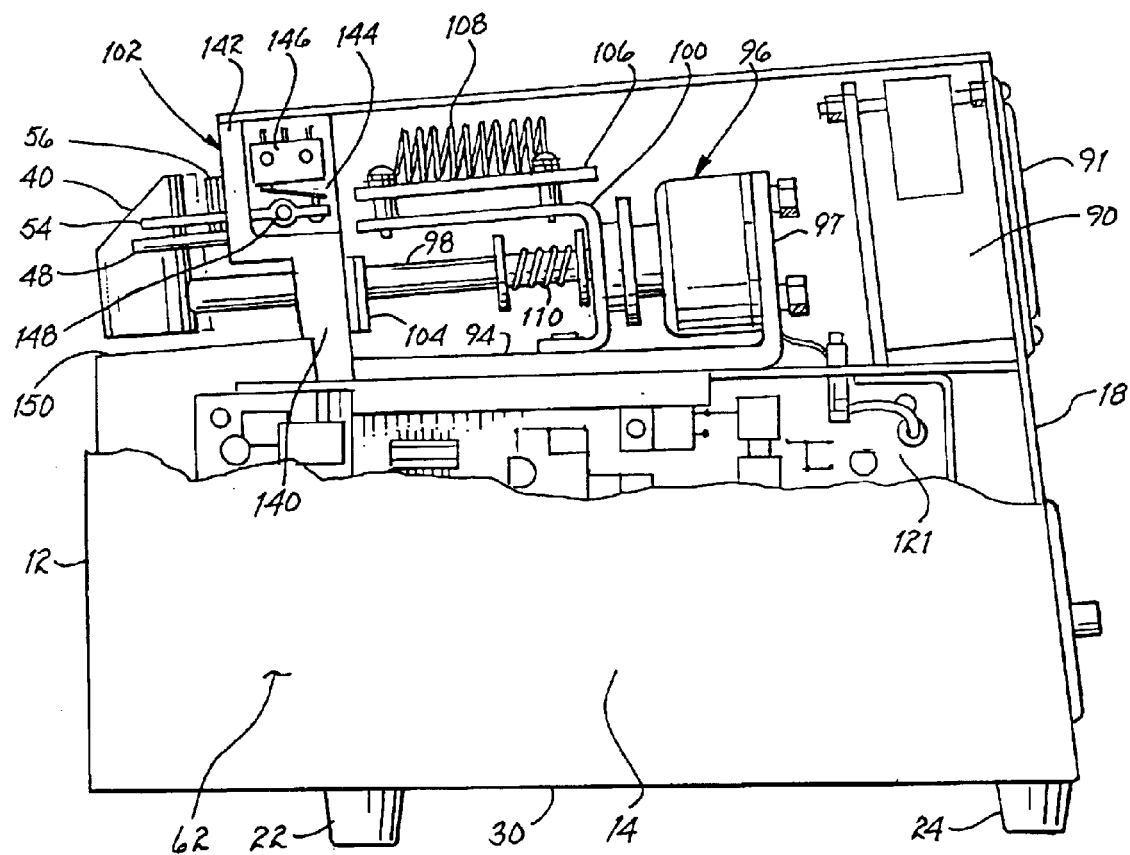
FIG. 3 is a partial side view illustrating the chassis supporting the solenoid assembly, the fan assembly and the circuit board built in accordance with surface mount technology.

Referring to FIG. 1A, there is shown a bench top tubing sealer 10 configured as a wedge shape having an apex 12 at the front, a pair of diverging planar sides 14, 16 terminating at a slanted planar rear side 18. Thereby, the wedge shape improves the ergonomics of the sealer by displacing rearwardly most of the chassis metal work and the associated electrical and mechanical components to a location behind the location of the seal formation. Top 20 is essentially in a configuration of a truncated isosceles triangle sloping downwardly toward apex 12. Feet 22, 24 along with feet 26, 28, shown in FIG. 2, insure that bottom 30 is above the supporting surface to thereby accommodate an outflow of exhausted cooling air through outlet ports in the bottom. A movable grounded jaw 40, also shown in FIG. 1B, is movable toward and away from a fixed jaw 42, as depicted by arrow 44 and dashed line 46. The fixed and movable jaws are located at the apex. This location improves accessability for an operator by allowing the operator's hands to support the tubing on both sides of the movable and fixed jaws. The movable jaw is relatively massive on the order of 100 times or more of the mass of the mass of electrode 58 of the fixed jaw to serve as a heat sink for the heat generated in the tubing during formation of a seal. With its large surface area on the order of 10 times or more of surface area of electrode 58 of the fixed jaw, heat is dissipated by convection to the atmosphere. Thereby, there is little likelihood of hemolysis of the blood or burn through of the tubing due to an increasing temperature of the movable jaw resulting from rapid multiple welding cycles. Sloping surface 41 serves as a guide to guide the tubing into place between the jaws prior to the making of a weld. A pair of guides or rods 48, 50 extend from sealer 10 on opposed sides of movable jaw 40 to support tubing 52 to be sealed at the correct height relative to the fixed and movable jaws. Additionally, the rods serve to guide the movable jaw and to prevent rotation of the movable jaw about the longitudinal axis of the supporting shaft and the movable jaw is maintained in alignment with the fixed jaw. A lever 54 operatively associated with a micro switch or the like, is vertically pivotable in response to tubing 52 placed thereon and moved downwardly into contact with rods 48, 50. Upon pivotal movement of the lever, circuitry is actuated to transmit RF energy from fixed jaw 42 to movable jaw 40 and cause tubing 52 disposed therebetween to become heated to a temperature sufficient to form a weld across the tubing in response to the pressure exerted by movable jaw 40 moving toward fixed jaw 42. As particularly noted in FIG. 1B, fixed jaw 42 includes a base 56 of ceramic electrically non-conducting material and an electrode 58 disposed vertically along the middle of the jaw. A transparent shield or disc 60 is attached to and extends from top 20 to shield an operator from upward splatter of any blood from burst tubing 52 or a segment thereof. The disc also serves as an impediment to prevent an operator from contacting the fixed jaw.

FIG. 1C is similar to FIG. 1A but also shows the option of demountably mounting a shelf 32 on either side of sealer 10 for the purpose of supporting a blood bag while the tubing (52) extending therefrom is being sealed. The shelf may be detachably attached to pins 34, 36 (see FIG. 1A) extending from each or either of sides 14, 16 that would mate with keyhole shaped apertures in the rear side of the shelf; alternatively, conventional nut and bolt means or other more permanent fastening means can be used. A handle 36 may be attached to and extend from rear side 18 to assist in carrying the sealer.

FIG. 2 is a perspective view primarily illustrating the components of sealer 10 housed within cover 62. A bottom or base 30 is supported upon feet 22, 24, 26 and 28 to retain the base above a supporting surface. Rear side 16 may be formed as a part of base 30 and bent upwardly or it may be a separate sheet of material suitably attached to the rear edge of the base. A bracket or shelf 64 is attached to rear side 18 by fastening means 66 engaging one or more flanges 68 bent from the shelf. Both base 30 and shelf 64 include a plurality of slots serving as passageways for air flow. Recent rule changes in the United States and countries foreign thereto have enacted strict regulations relating to RF radiation from electrical equipment at frequencies other than that specifically authorized for such equipment. RF radiation of this type is generally referred to as spurious and unauthorized RF radiation. The reason for these regulations relate to a possibility that if equipment operating at its assigned frequency emits spurious and unauthorized RF radiation that affects other equipment, a malfunction or inaccurate operation of the other equipment may occur. Hence, controls must be in place to prevent spurious and unauthorized RF radiation from electrical equipment. These slots are specifically configured in size to restrict transmission of spurious and unauthorized RF radiation therethrough; such configuration of the slots is set forth in texts and other reference materials. For example, if the slots are 0.060 inches or less wide, RF radiation only at a frequency of about 40.68 mHz will be transmitted therethrough, which frequency corresponds with that authorized for tubing sealers in the United States.

For purposes of rigidity and to secure the cover in place, each side of base 30 may include an upwardly bent flange 72 having threaded holes 74 for threaded engagement by machine screws. Similarly, the vertical edges of rear side 18 may include a plurality of flanges 76 bent inwardly and supporting threaded holes 78 for engagement by machine screws extending through cover 62. For rigidity purposes, opposed edges of shelf 64 may include bent flanges 80 that may or may not be attached to cover 62 by machine screws.

Referring jointly to FIGS. 2, 3, 4 and 5, further details of the internal construction and arrangement of parts will be described. Rear side 18 above shelf 64 supports a conventional fan and motor assembly 90 and draws in air through hole 92. A grill, such as grill 91 shown in FIG. 11, may extend across the hole. As particularly noted in FIG. 3, rear side 18 cants forwardly at a discernable angle. A bracket 94 is mounted on shelf 64 to support a solenoid assembly 96. The purpose of solenoid assembly 96 is that of periodically on command causing translation of shaft 98, which shaft supports movable jaw 40. To stabilize the shaft and the solenoid assembly, a further bracket 100 is attached to bracket 94. A face plate 102 secured to and extending upwardly from shelf 64 includes a bearing 104 slidably supporting shaft 98. As illustrated, brackets 94 and 100 locate solenoid assembly 96 and shaft 98 at a downward angle in the range of about five to thirty degrees (5° to 30°) extending downwardly toward apex 12 of sealer 10. This orientation of shaft 98 will preclude fluids from entering the sealer through the bearing supporting the shaft or from migrating along the shaft in the event of a rupture of the tubing during the sealing process. A plate 106 may be attached to bracket 100 for supporting an electrical coil 108 and/or other electrical components relating to tuning and transmission of RF energy to fixed jaw 56. In operation, actuation of solenoid assembly 96 will cause retraction of shaft 98 to draw movable jaw 40 toward fixed jaw 56. On cessation of a signal to solenoid 97, spring 110 will act upon shaft 98 and cause extension of the shaft and movement of movable jaw 40 away from fixed jaw 56. For nomenclature purposes, the combination of solenoid 97, shaft 98 and related components will be generally referred to as solenoid assembly 96.

Figure 4:
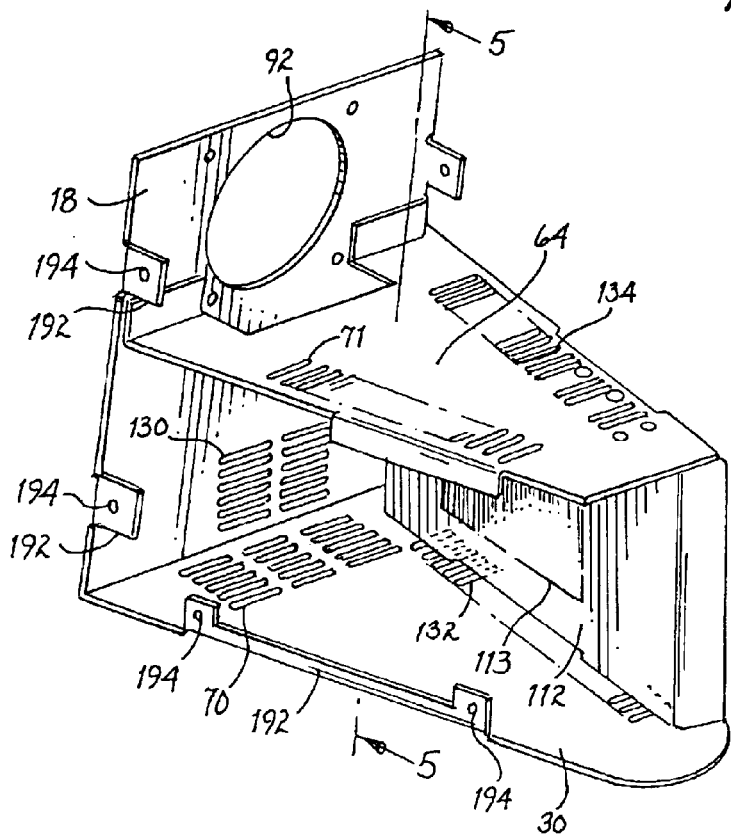
FIG. 4 is a perspective view of the chassis.
Figure 5:
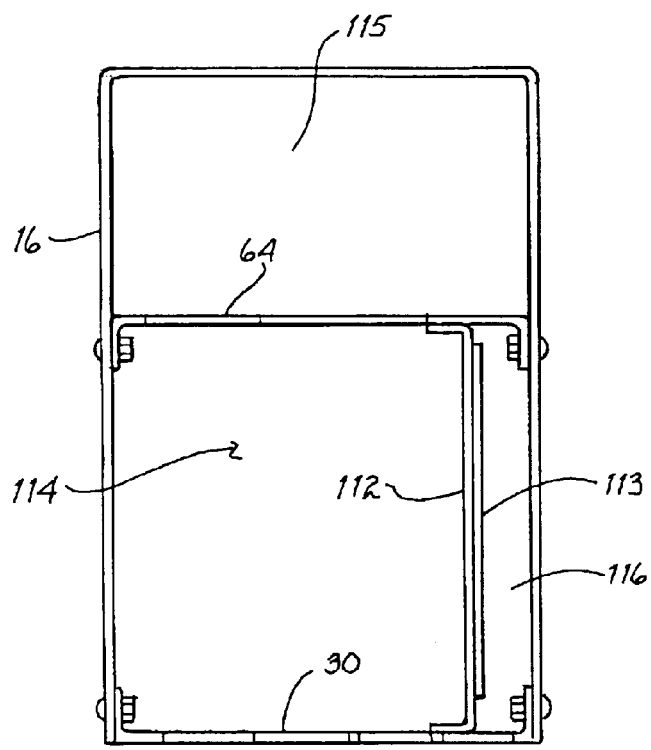
FIG. 5 is a cross sectional view taken along lines 5—5, as shown in FIG. 4.
Figure 6:
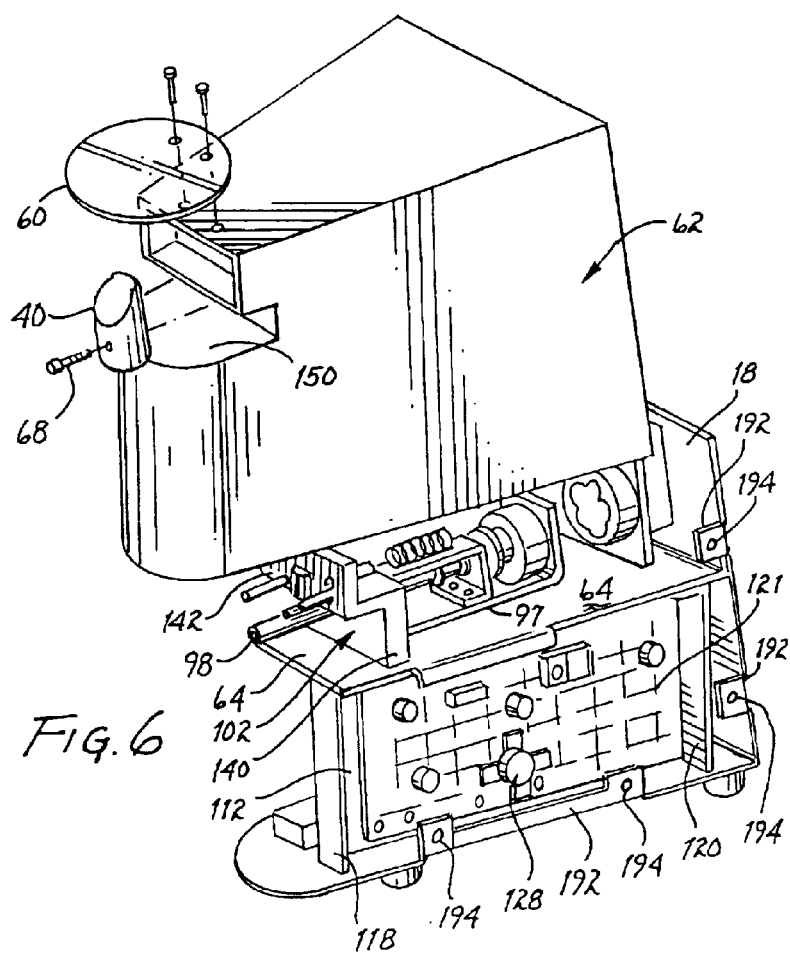
FIG. 6 is an exploded view illustrating the chassis with components mounted thereon and the cover attachable to the chassis.
Figure 9:
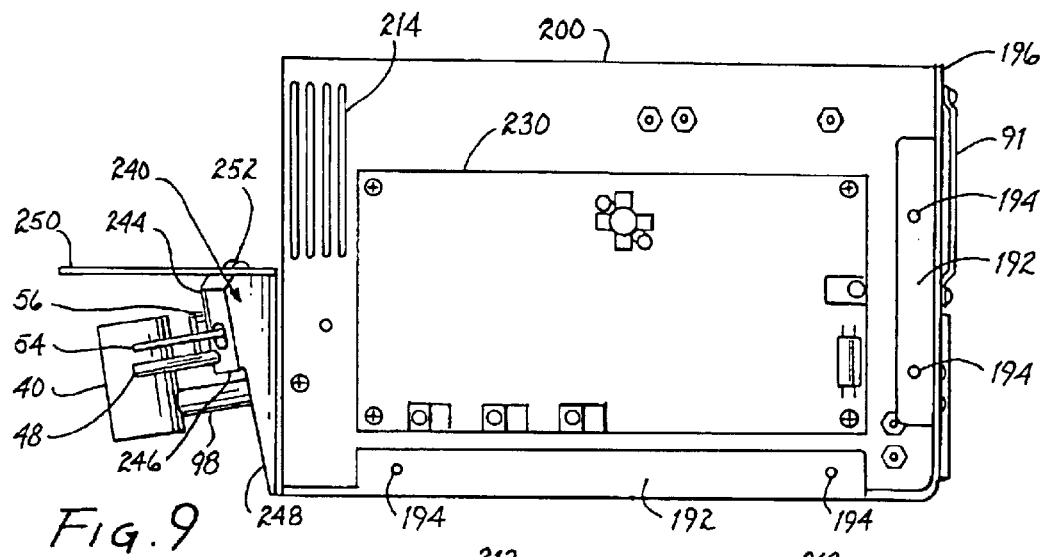
FIG. 9 is a left side view of the variant with the cover removed.
Figure 10:
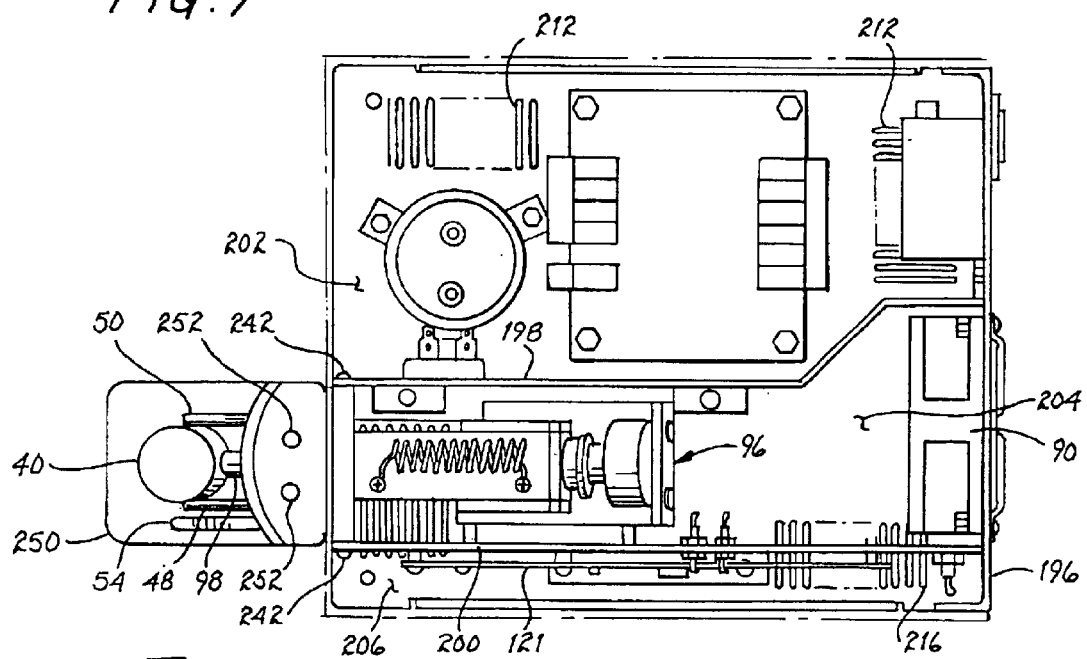
FIG. 10 is a top view of the components and chassis of the variant.

A bracket 112, as particularly shown in FIGS. 4 and 5, is secured to base 30 and shelf 64 to define two compartments 114, 116 between the base and the shelf. As shown in FIG. 6, bracket 112 includes end plates 118, 120 extending laterally for physical contact with side 14 of cover 62 when the cover is in place. Thereby, compartment 116 is essentially closed off from the remaining space within sealer 10 upon installation of cover 62 and houses an electronic circuit on a circuit board 121. Compartment 114 houses various components collectively referred to as power supply 122, as shown in FIG. 2. These components may include a receptacle 123 mounted on rear side 18 for engagement by the plug of a cord connected to a source of electrical power. A transformer 124, in combination with a condenser 126 and other electrical components provide the requisite power for operation of fan assembly 90, solenoid assembly 96 and circuit board 121. Various plugs, terminals and electrical conductors are incorporated to conduct electrical power to the corresponding electrical components. As such power supplies are well known, a detailed explanation is not necessary. Preferably, the power supply, condenser and other components are mounted upon base 30, as shown.

Compartment 116 houses circuit board 121, which may be mounted upon bracket 112. The circuit board supports electronic circuitry constructed of numerous components embodying and adapted to surface mount technology. The use of such components has several benefits. First, the components are relatively small sized. Secondly, the heat generated through operation is generally less than that generated by components attendant older technology. Third, the costs of assembly, testing and repair of a circuit board using surface mount technology are substantially less than that of circuit boards embodying discrete components commensurate with older technology. An RF power transistor 128 (MRF sold by Motorola, Inc.) is a major generator of heat. A heat sink 113 associated with the RF power transistor is in direct physical contact with bracket 112 to transfer heat to the bracket. Thereby, heat from the heat sink (and RF power transistor) will be transferred to the bracket and heat in the bracket will be drawn off by the air flow scrubbing the bracket.

As particularly shown in FIG. 4, a plurality of slots 70 are formed in base 30 to serve as exhaust ports or outlet ports. A similarly grouping of slots 130 are formed in rear side 18 beneath shelf 64. A plurality of slots 132 are formed in base 30 extending on either side of bracket 112. A plurality of slots 71, as discussed above, are formed in shelf 64 in fluid communication with compartment 114. A plurality of slots 134 are also formed in shelf 64 laterally outwardly of bracket 112 and short of the corresponding edge of the shelf and generally corresponding with compartment 116. As discussed above, the configuration of each of these groups of slots is in accordance with known dimensions to prevent transmission/radiation of spurious and unauthorized RF radiation therethrough. It is also known that a plurality of circular holes of specific size and spacing may be used in place of the illustrated slots to permit air flow therethrough and yet inhibit transmission of spurious and unauthorized RF radiation therethrough. Thus, whether slots or circular holes are used for air flow purposes, is primarily a matter of manufacturing considerations.

The process for cooling the various components will be described below. Upon actuation of fan assembly 90, air will be drawn in through hole 92 and flow in and about solenoid assembly 90 in compartment 115 to cool the components of the solenoid assembly. The air flow in compartment 115 is exhausted through slots 71 and 134 into compartment 114 and compartment 116, respectively. The air flow in and about the components in each of compartments 114, 116 will draw heat from the respective components to maintain them at an acceptable temperature. Furthermore, the air flow adjacent bracket 112 will draw heat therefrom that is produced by the abutting heat sink of RF power transistor 128. The air from compartment 114 will exhaust through slots 70,130 and 132. The air flow from compartment 116 will exhaust through slots 132. Thereby, the exhausted air flow through slots 70, 130 and 132 will not be toward an operator facing apex 12 of sealer 10. Furthermore, cover 62 will remain relatively cool and of sufficiently low temperature so as not to present any kind of safety hazard to the operator.

Face plate 102, as particularly shown in FIGS. 2, 3 and 6, is preferably of translucent material, such as plastic materials sold under the trademark DELRIN or semi-translucent material, such as ABS plastic. The face plate includes a pedestal 140 attached to shelf 64 to support a block 142. The block includes an indentation 144 supporting a micro switch 146 therein electrically connected to circuitry on circuit board 121. Lever 154 is pivotally mounted in indentation 144 upon a shaft 148 or the like. Upon downward movement of the protruding end of the lever, it will close the circuit in microswitch 146 and the circuit board will be energized to apply RF energy to fixed jaw 56. Rods 48, 50 extend from block 142. These rods serve several purposes. First, they guide translational movement of movable jaw 40. Second, they prevent rotational movement of the movable jaw about the longitudinal axis of shaft 68. Third, they maintain alignment of the movable jaw with fixed jaw 56. Fourth, the rods regulate positioning of the tubing prior to and during sealing. These rods may be lighted by a lamp or lamps 49, 51 (see FIG. 2B) mounted within block 142, in which event the rods are preferably of light transmitting material, such as a polycarbonate plastic. Fixed jaw 56, mounted on face 149, includes a vertically oriented electrode 58 supported on either side by a ceramic element 59. The fixed jaw is supported by block 142 by a rod extending into the block, which rod is in electrical contact with electrode 58 and ultimately with circuit board 121. It is understood that tuning coil 108 may be electrically connected to electrode 58 through the rod.

As shown in FIGS. 2A, 2B and 2C, block 142 may also include a plurality of cavities for housing one or more status or indicator lights relating to readiness of the sealer to perform a sealing function, completion of a seal, and other indicators of status. For example, lamp 260 mounted within cavity 262 may include an attached short antenna 264 responsive to RF radiation and will light whenever RF radiation is present, such as when a seal is being formed. The lamp may be color coded. A further lamp 266 mounted within cavity 268 may be hard wired through electrical conductors 270, 272 to circuit board 121 to provide an indication that the sealer is ready to make a seal. This lamp may be color coded. As block 142 is translucent, energization of each light will be visually apparent to an operator, as suggested by circles 274, 276, respectively, shown in dashed lines. By having such lamp containing cavities open only to the inside of the sealer, no passageway for entry of blood from a burst tubing or a tubing segment can enter the sealer through block 142.

As set forth above, a source of air flow is provided by fan and motor assembly 90 into compartment 115 housing solenoid assembly 96. As shown, face plate 102 essentially forms the front end of compartment 115. To help cool the movable jaw during a high production rate of sealing tubing, air flows for this purpose may be incorporated. As particularly shown in FIGS. 2A, 2B and 2C, a passageway 280 extends through block 144 to convey an air flow from compartment 115 into proximity of fixed jaw 58 and movable jaw 40. To help direct the air flow, front end 282 of passageway 280 may be turned downwardly through an angle α, which angle is a function of the position of passageway 280 relative to the fixed and movable jaws to cause an air flow thereabout. It may be well to point out that heating of the tubing is accomplished by irradiating the tubing with RF radiation emitted from electrode 58 bounded by ceramic element 59. Preferably, this electrode would remain at room temperature but heat by conduction from each weld being formed in the tubing will tend to heat the electrode. Similarly, grounded movable electrode 40 will remain essentially at room temperature but due to heat transfer by conduction from each weld being formed in the tubing, the movable jaw will tend to acquire thermal energy and a rise in temperature may occur. Thus, maintaining the fixed and movable jaws as close to ambient temperature as possible is a goal of the configuration and structure of the fixed and movable jaws and augmented by the air flow emanating from passageway 280. For further cooling purposes, additional passageways 284, 286 may extend through pedestal 140 to direct air from compartment 115 primarily onto movable jaw 40. Each of passageways 280, 284 and 286 may be circular in cross section like passageways 284, 286 or rectangular in cross section like passageway 280. Other cross sectional configurations may also be incorporated.

As particularly noted in FIG. 3, block 142 extends forwardly from pedestal 140 to provide an overhang above the protruding part of shaft 98. Additionally, the undersurface of the overhang slopes downwardly forwardly. There are two main purposes for this overhang. First, in the event of burst tubing and resulting in spillage of blood, any blood spattering upon face plate 102 will drain downwardly and not along the underside of the overhang because of its slope. Thus, any blood dripping from the face plate that would strike shaft 98, only that part of the shaft extending outwardly from a vertical plane aligned with the face plate would receive blood. Secondly, table 150, formed as part of cover 62, slopes downwardly. Accordingly, any blood either dripping off the face plate or dropping directly on table 150 would tend to migrate forwardly toward apex 12 and not rearwardly to the intersection of the table with pedestal 140. Thereby, the likelihood of blood entering sealer 10 at the junction between pedestal 140 and table 150 is very remote. The overhang of block 142 is dimensioned to be greater than and the extent of travel of shaft 98. Thereby, blood dripping onto the shaft cannot be conveyed by the shaft into contact with pedestal 140 since the travel of the shaft will be less than the distance from the outer edge of the block to the pedestal. Moreover, the downward slope of the shaft (5°–30°) will prevent any blood on the shaft from migrating toward the pedestal. Thereby, the shaft will not draw or otherwise convey any blood dripping thereon into the pedestal nor into sealer 10.

Disc 60 may be attached to top 20 of cover 62, as shown in FIG. 6. Preferably, the disc is circular as depicted and transparent. With such transparency, the disc will not impede visual inspection of the placement of the tubing between the jaws, visual verification of the seal being made and generally proper placement of the tubing between the jaws. However, the disc will protect an operator against upward splatter of any blood from a burst tubing or segment of tubing during the sealing process and it will interfere with access by an operator to the fixed jaw.

Figure 11:
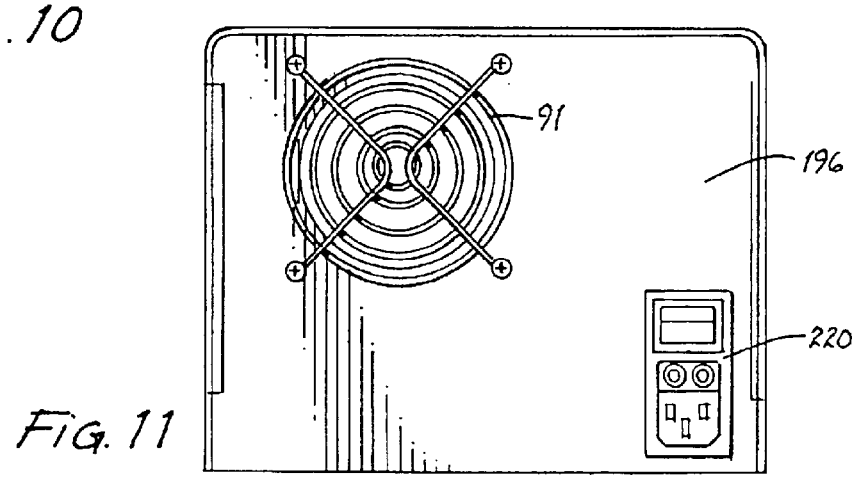
FIG. 11 is a rear view of the variant.

Referring to FIGS. 7A, 7B, 8, 9, 10 and 11, there is shown a variant sealer 180. This sealer incorporates all of the valuable attributes and capabilities of sealer 10, however, the packaging of this sealer is different. In view of the degree of commonality between certain elements of sealer 10 and variant 180, common reference numerals will be used for common elements. Cover 182 may be rectangular, as shown, or square, and may include a handle 184 for convenience in relocating the variant sealer. A cut-out 186, generally in rectangular configuration, in the cover accommodates protrusion therethrough of jaw assembly 188, which jaw assembly includes elements essentially duplicative of the jaw assembly described with respect to sealer 10. Base 190 is generally rectangular or square in planform to conform with cover 182 and includes a plurality of flanges 192, each flange including one or more threaded holes 194 for threadedly receiving machine screws to secure the cover to the base. A rear side 196 extends upwardly from base 190 at the rear edge thereof for supporting various components such that all components of variant sealer 180 are mounted or affixed to base 190; necessarily, cover 182 does not include a rear side. A bracket 198 is attached to and extends upwardly from base 190. A further bracket 200 is also attached to base 190 and extends upwardly therefrom. These two brackets, in combination with cover 182, and base 190 define three compartments 202, 204 and 206 (note FIG. 10). Compartment 202 houses power supply assembly (122). Compartment 204 houses the solenoid assembly (96) and compartment 206 houses a circuit board (121). A fan and motor assembly 90 is mounted on rear side 196; it may include an exterior grill 208, as shown in FIG. 11. The fan and motor assembly provides an air flow into compartment 204 to cool solenoid assembly 96 mounted in compartment 204. This solenoid assembly is essentially the same as solenoid assembly 96 embodied in sealer 10. However, brackets 94, 100 locate the longitudinal axis of shaft 98 in the range of about five degrees (5°) to about thirty degrees (30°) downwardly from a horizontal plane. Air flow from compartment 204 is directed into compartment 202 housing power supply assembly 122 through a plurality of slots 210 formed in bracket 198. The air flow into compartment 202 is exhausted through a plurality of slots 212 disposed in base 190. The air flowing into compartment 204 is partly exhausted through slots 214 in bracket 200 into compartment 206 housing circuit board 121. The inflowing air is exhausted from compartment 206 through a plurality of slots 216 disposed in base 190; slots 216 may be in fluid communication with each of compartments 204, 206, as shown, and exhaust air from these compartments. As set forth above, the slots attendant variant 180 are configured to prevent spurious and unauthorized RF radiation therethrough; alternatively, these described sets of slots may be substituted by a plurality of holes of a size and arrangement such that spurious and unauthorized RF radiation will not pass therethrough. Accordingly, a common source of inflowing air is provided by fan and motor assembly 90 and the inflowing air is channeled through each of the three compartments to cool the components therein and the air flow is ultimately exhausted from variant 180 through base 190. The power supply is located within compartment 202 and may include a receptacle 220 for connection to a source of electric power. A transformer 222, along with a condenser 224 form part of the power supply. Various other connectors, electrical conductors and miscellaneous electrical components may be disposed within compartment 202 to provide the required power and voltage levels necessary for operation of the solenoid assembly and the components mounted on the circuit board.

A circuit board 121 is mounted within compartment 206. This circuit board may embody components commensurate with surface mount technology to develop the required signals and power for operation of the solenoid assembly and for generating RF energy at the required power levels and duration necessary to perform a sealing function by welding the tubing placed between the fixed and movable jaws. Necessarily, appropriate terminals, electrical conductors, connectors, etc. to receive and distribute electrical power and for transmitting various electrical signals may be incorporated within compartment 206 or secured to bracket 200, such as the two terminals illustrated. Moreover, the circuit board may include a high power heat generating RF power transistor (such as a MRF from Motorola, Inc., as discussed above) that includes a heat sink (for instance, such as heat sink 113 shown in FIGS. 4 and 5) in mechanical and thermal contact with bracket 200. Thus, heat is conductively transferred from the heat sink of the RF power transistor to the bracket. Solenoid assembly 96 is essentially identical with the solenoid assembly described above with respect to sealer 10.

Face plate 240 is configured differently from face plate 102 for sealer 10 and will be described in further detail. Face plate 240 may be secured intermediate brackets 198,200 by screws 242, or the like. It includes a passageway to slidably receive shaft 98 supporting movable jaw 40. As depicted, the shaft, along with solenoid assembly 96, is mounted to cause translation of the shaft at a downward forward angle that may be in the range of about five degrees (5°) to about thirty degrees (30°). The face plate includes an overhang 244 supporting fixed jaw 56 and guides or rods 48, 50. A lever, such as lever 54, may be incorporated to actuate the variant upon depressing same by inserting tubing between the fixed and movable jaws and against rods 48,50. Alternatively, the lever may be omitted and other apparatus/switch may be incorporated to actuate the variant. The overhang includes an underside 246 slanting downwardly and forwardly to reduce the likelihood of blood flowing along the face plate that may splatter upon the overhang as a result of burst tubing or a burst segment. Furthermore, side 248 of face plate 240 slopes downwardly and rearwardly to reduce the likelihood of blood flowing therealong from a burst tubing or segment. Whatever blood may flow along side 248 will not have a tendency to enter variant 180 through any crack between the face plate and base 190 as the face plate extends passed the edge of the base. A transparent guard 250 is attached to face plate 240 by screws 252 or the like. This guard is preferably transparent to permit viewing of each seal being performed along with the positioning of the tubing intermediate the jaws upon rods 48,50 and yet protect an operator against splatter of blood from a burst tubing or segment. Movable jaw 40 need not have the sloping surface (41) described with respect to sealer 10 if the angle of translation of shaft 98 in variant sealer 180 is sufficiently large and the resulting easier access to place the tubing between the fixed and movable jaws.

We claim:

1. A tubing sealer for sealing fluid filled tubing, said tubing sealer comprising in combination:
   a) a housing having a base, a cover and brackets disposed within said housing for delineating three compartments within said housing;
   b) a solenoid assembly disposed in one of said compartments;
   c) a circuit board disposed in another of said compartments for providing a source of RF energy and for actuating said solenoid assembly;
   d) a power supply disposed in yet another of said compartments for providing electrical power to said solenoid assembly and to said circuit board;
   e) a face plate secured to said housing for supporting a fixed jaw;
   f) an electrically grounded movable jaw adapted for rectilinear translation in response to actuation of said solenoid assembly to squeeze a length of tubing against said fixed jaw;
   g) a switch for actuating said circuit board to energize said solenoid assembly and to transmit RF energy at a predetermined frequency from said fixed jaw through the tubing to said movable jaw and heat the tubing to form a welded seal; and
   h) a source of air flow directed through each of said compartments, including a plurality of apertures disposed in components of said housing for conveying the air flow, each aperture of said plurality of apertures being configured to inhibit spurious and unauthorized transmission therethrough of RF energy at other then the predetermined frequency.

2. A tubing sealer as set forth in claim 1 including a pair of guides extending from said face plate for guiding translatory movement of said movable jaw and for preventing rotation of said movable jaw about its axis of translation.

3. A tubing sealer as set forth in claim 2 wherein said pair of guides are positioned relative to said fixed jaw to locate tubing placed upon said pair of guides in operative engagement with said fixed jaw.

4. A tubing sealer as set forth in claim 1 wherein one of said brackets is a shelf for supporting one of said solenoid assembly, power supply and circuit board.

5. A tubing sealer as set forth in claim 1 wherein said circuit board includes an RF power transistor component with an associated heat sink and wherein said heat sink is in thermally conductive contact with one of said brackets.

6. A tubing sealer as set forth in claim 1 wherein said face plate includes a pedestal supporting an overhang having a front for supporting said fixed jaw, and including a rectilinearly translatable shaft extending from said solenoid assembly for imparting translatory movement to said movable jaw, said face plate including an opening of a passageway disposed in said pedestal penetrably engaged by said shaft, said opening being at a distance from said front greater than the extent of translatory movement of said shaft.

7. A tubing sealer as set forth in claim 1 wherein said switch includes a pivotable lever pivotally responsive to placement of the tubing adjacent said fixed jaw.

8. A tubing sealer as set forth in claim 1 wherein said solenoid assembly provides rectilinear translation of said movable jaw at an angle in the range of about five degrees (5°) to about thirty degrees (30°) extending downwardly from a horizontal plane.

9. A tubing sealer as set forth in claim 1 including a transparent shield extending from said housing above said fixed and movable jaws.

10. A tubing sealer as set forth in claim 1 including at least one illuminateable status indicator disposed within said face plate and adapted to be viewable through said face plate.

11. A tubing sealer as set forth in claim 10 including a further indicator disposed within said face plate, said further indicator being responsive to the presence of RF energy and being adapted to be viewable through said face plate.

12. A method for sealing fluid filled tubing with a tubing sealer, said method comprising the steps of:
   a) providing an electrical power supply within one compartment of the sealer;
   b) actuating a grounded movable jaw toward and away from a fixed jaw with a solenoid assembly being disposed in another compartment of the sealer and energized by the source of electrical power;
   c) generating RF energy at a predetermined frequency and control signals with circuitry on a circuit board receiving electrical power from the power supply, the circuit board being disposed in yet another compartment of the sealer, including the step of energizing the fixed jaw with RF energy at a predetermined frequency and providing control signals to the solenoid assembly to actuate the movable jaw;
   d) producing an air flow through each of the compartments to draw off heat;
   e) exhausting the air flow through apertures adapted to prevent transmission therethrough of RF energy at other than at the predetermined frequency.

13. The method as set forth in claim 12 including the step of restricting rotation of the movable jaw about its axis of rectilinear translation.

14. The method as set forth in claim 12 including the step of guiding the movable jaw in alignment with the fixed jaw during rectilinear translation of the movable jaw.

15. The method as set forth in claim 12 including the step of locating the tubing relative to the fixed and movable jaws at a predetermined location.

16. The method as set forth in claim 15 including the step of initiating operation of the circuitry upon exercise of said step of locating.

17. The method as set forth in claim 12 including the step of channeling a flow of air to the fixed and movable jaws.

18. The method as set forth in claim 12 including the step of drawing heat from the tubing being welded with the movable jaw by conduction and the step of cooling the movable jaw by convection.

19. The method as set forth in claim 12 wherein the movable jaw is supported upon a rectilinearly translatable shaft and including the step of rectilinearly translating the shaft and the movable jaw along an angle in the range of about 5° to about 30° below horizontal.

20. The method as set forth in claim 12 including the step of shielding the fixed jaw to reduce the likelihood of an operator contacting the fixed jaw.

21. The method as set forth in claim 12 including the step of applying RF energy only to the fixed jaw and the step of maintaining the movable jaw grounded.

22. A tubing sealer for sealing tubing by forming a weld across the tubing, said tubing sealer comprising in combination:
   a) a housing having three discrete compartments therein, each of a power supply, a solenoid assembly and an electronic circuit being disposed in one of said compartments;
   b) a fixed jaw mounted in a face plate secured to said housing, said fixed jaw including an electrode adapted for receiving RF energy from said electronic circuit at a predetermined frequency and for radiating RF energy into the tubing in response to actuation of said electronic circuit;
   c) a grounded movable jaw adapted to be rectilinearly translatable in response to operation of said solenoid assembly to compress the tubing against said fixed jaw;
   d) switch means for actuating said electronic circuit to apply RF energy at the predetermined frequency to said fixed jaw;
   e) a source of air flow directed into each of said compartments for drawing off heat produced therein; and
   f) outlet ports disposed in said housing for exhausting the heated air, said outlet ports being adapted to restrict transmission therethrough of RF radiation at a frequency other than the predetermined frequency.

23. A tubing sealer as set forth in claim 22 including a face plate disposed in said housing for supporting said fixed jaw, a shaft interconnecting said solenoid assembly with said movable jaw and a passageway disposed in said face plate for supporting said shaft.

24. A tubing sealer as set forth in claim 23, said face plate including passageways adapted for directing a flow of air on said fixed jaw and on said movable jaw to draw heat from said fixed jaw and from said movable jaw.

25. A tubing sealer as set forth in claim 23 including a pair of rods extending from said face plate adapted for guiding said movable jaw, for preventing rotation of said movable jaw about the axis of said shaft, for aligning said movable jaw with said fixed jaw and for positioning the tubing prior to welding the tubing.

26. A tubing sealer as set forth in claim 25 including a lever extending from said face plate and a microswitch mounted on said face plate responsive to pivotal movement of said lever and adapted to actuate said electronic circuit to generate the RF energy and to generate control signals.

27. A tubing sealer as set forth in claim 26 wherein said lever is adapted to be pivotally repositioned by the tubing upon placement of the tubing upon said pair of rods.

28. A tubing sealer as set forth in claim 25 including an illuminator for illuminating at least one of said pair of rods.

29. A tubing sealer as set forth in claim 23 wherein said face plate includes a block extending from a pedestal to define an overhang, wherein said fixed jaw is mounted on said block and wherein said passageway extends through said pedestal.

30. A tubing sealer as set forth in claim 29 wherein the length of the overhang above said shaft extending from said pedestal is greater than the extent of rectilinear translation of said shaft.

31. A tubing sealer as set forth in claim 23 including at least one lamp disposed in a cavity within said face plate, said lamp being adapted to be responsive to presence of RF energy to provide a visual indication of a weld being formed in the tubing.

32. A tubing sealer as set forth in claim 31 including at least a further lamp disposed within a further cavity within said face plate, said further lamp being adapted to be responsive to said sealer being ready to form a weld in a tubing.

33. A tubing sealer as set forth in claim 22 wherein said compartments are formed by a base, a shelf, a bracket and a cover.

34. A tubing sealer as set forth in claim 33 wherein said power supply, said solenoid assembly and said electronic circuit are mounted on other than said cover.

35. A tubing sealer as set forth in claim 22 wherein said compartments are formed by a base, a pair of brackets and a cover.

36. A tubing sealer as set forth in claim 35 wherein said power supply, said solenoid assembly and said electronic circuit are mounted on other than said cover.

37. A tubing sealer as set forth in claim 22 wherein the mass of said movable jaw is at least 10 times the mass of said electrode of said fixed jaw.

38. A tubing sealer as set forth in claim 22 wherein the surface area of said movable jaw is at least 10 times the surface area of said electrode of said fixed jaw.

* * * * *